United States Patent
Majjiga et al.

(10) Patent No.: US 11,973,666 B1
(45) Date of Patent: Apr. 30, 2024

(54) SYSTEMS AND METHODS FOR USING BLOCKCHAIN TO MANAGE SERVICE-LEVEL AGREEMENTS BETWEEN MULTIPLE SERVICE PROVIDERS

(71) Applicant: Verizon Patent and Licensing Inc., Basking Ridge, NJ (US)

(72) Inventors: Deepak Majjiga, Tirupati West (IN); Raghuram Parvataneni, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/045,649

(22) Filed: Oct. 11, 2022

(51) Int. Cl.
*G06F 16/23* (2019.01)
*G06F 16/27* (2019.01)
*H04L 41/0686* (2022.01)
*H04L 41/5009* (2022.01)
*H04L 41/5019* (2022.01)

(52) U.S. Cl.
CPC ...... *H04L 41/5019* (2013.01); *H04L 41/0686* (2013.01); *H04L 41/5009* (2013.01)

(58) Field of Classification Search
CPC ............. H04L 41/5019; H04L 41/0686; H04L 41/5009
See application file for complete search history.

(56) References Cited

U.S. PATENT DOCUMENTS

| | | | | |
|---|---|---|---|---|
| 2019/0014124 A1* | 1/2019 | Reddy | ................. | H04L 41/5096 |
| 2019/0155513 A1* | 5/2019 | Maeda | .................. | G06F 3/0641 |
| 2019/0253274 A1* | 8/2019 | Van Dussen | ........ | H04L 12/4641 |
| 2020/0117657 A1* | 4/2020 | Xie | ......................... | H04L 9/3239 |
| 2020/0125661 A1* | 4/2020 | Albright | .................. | H04L 9/50 |
| 2020/0162328 A1* | 5/2020 | Valenza | .............. | H04L 41/0886 |
| 2021/0021619 A1* | 1/2021 | Smith | .................. | H04W 12/121 |
| 2021/0089011 A1* | 3/2021 | Emmert | ............. | G05B 19/0425 |
| 2021/0211363 A1* | 7/2021 | Papacica | ............. | H04L 41/5051 |
| 2021/0306211 A1* | 9/2021 | Landais | .................. | H04L 43/20 |
| 2021/0320797 A1* | 10/2021 | Koorella | ................... | H04L 9/50 |
| 2022/0129446 A1* | 4/2022 | Nishijima | ............... | G06F 21/64 |
| 2022/0253866 A1* | 8/2022 | Tedesco | ................... | G06N 5/04 |
| 2022/0311597 A1* | 9/2022 | Goel | ..................... | H04L 9/0891 |

(Continued)

FOREIGN PATENT DOCUMENTS

WO   WO-2022201445 A1 *  9/2022

*Primary Examiner* — Schquita D Goodwin

(57) ABSTRACT

In some implementations, a management system may receive service information from a plurality of service providers. A plurality of network devices, of the plurality of service providers, may be blockchain nodes of a blockchain. The service information, of a service provider, may identify network services provided by a network device of the service provider and identifies a location of the network device. The management system may receive, via the blockchain, information regarding a service-level agreement associated with a subset of service providers, of the plurality of service providers, providing network services for an application. The management system may receive, via the blockchain, an approval of the service-level agreement from each service provider of the subset of service providers. The management system may perform an action based on the service-level agreement and based on the network services provided by the subset of service providers for the application.

20 Claims, 10 Drawing Sheets

(56) References Cited

U.S. PATENT DOCUMENTS

| | | |
|---|---|---|
| 2022/0327652 A1* | 10/2022 | Sankaranarayanasamy ................ G06F 18/251 |
| 2022/0334818 A1* | 10/2022 | McFarland, Jr. ....... H04L 67/06 |
| 2023/0284186 A1* | 9/2023 | Negm ................ H04L 41/0806 370/329 |

* cited by examiner

SYSTEMS AND METHODS FOR USING BLOCKCHAIN TO MANAGE SERVICE-LEVEL AGREEMENTS BETWEEN MULTIPLE SERVICE PROVIDERS

BACKGROUND

Fifth Generation/New Radio (5G/NR) provides various enhancements to wireless communications, such as flexible bandwidth allocation, improved spectral efficiency, ultra-reliable low-latency communication (URLLC), beamforming, high-frequency (e.g., millimeter wave (mmWave)) communication, and/or other enhancements. A service provider may allocate a network slice, of a 5G/NR, to support an application requested by a user equipment.

DETAILED DESCRIPTION OF PREFERRED EMBODIMENTS

Figure 1A:
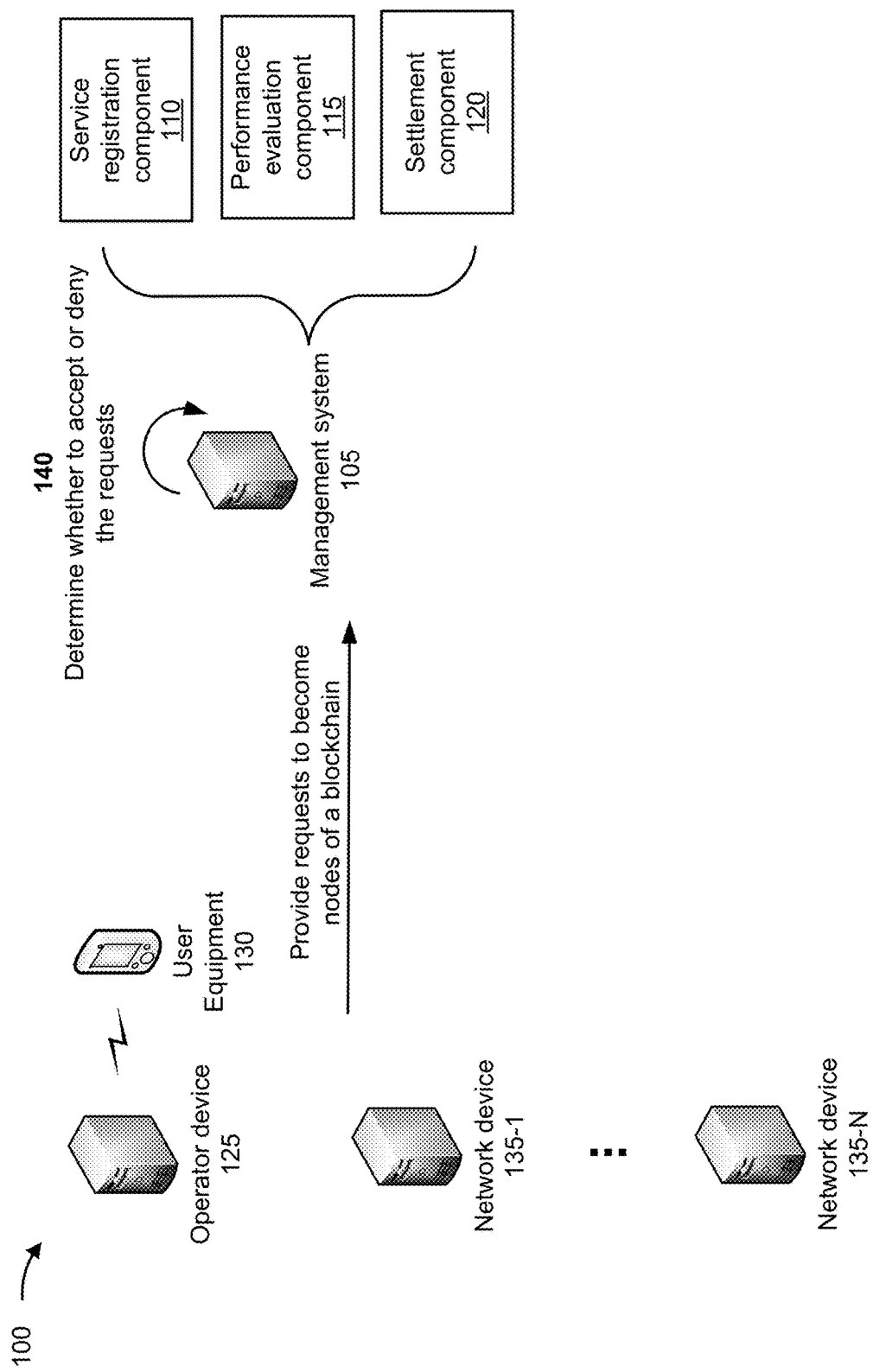
FIGS. 1A-1G are diagrams of an example associated with using blockchain to manage service-level agreements between multiple service providers.
Figure 1B:
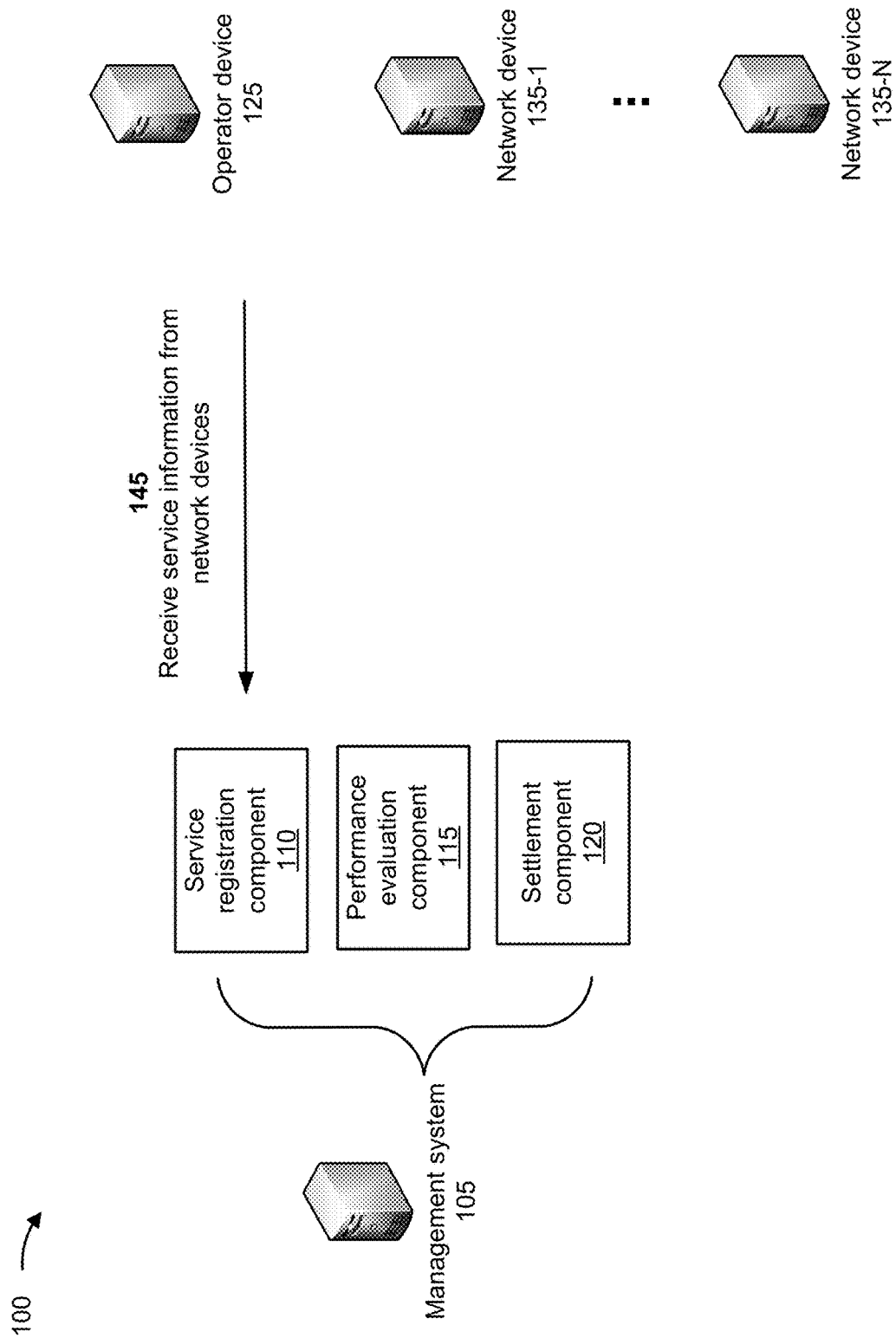

The following detailed description of example implementations refers to the accompanying drawings. The same reference numbers in different drawings may identify the same or similar elements.

A 5G/NR network, of a service provider, may enable the service provider to allocate network slices for different applications. For example, the service provider may allocate the network slices using network devices of the service provider. In some instances, a particular application may require significantly more resources (e.g., computing resources, graphics processing resources, network resources) than resources required by other applications.

The application may include an augmented reality/virtual reality application, an application used to interact with an autonomous vehicle, an application used to perform robotics operations, an application used to control an unmanned aerial vehicle that provides live streaming of a video captured by the unmanned aerial vehicle. The service provider may determine a service-level agreement for the particular application. The service-level agreement may include requirements that exceed requirements for the other applications.

In order to meet the requirements of the service-level agreement, the service provider may determine that the network slice is to be allocated using network services (e.g., 5G network functions) of additional service providers (e.g., different cloud services providers and/or different providers of network functions). For example, the service provider may determine that the network slice is to be allocated by deploying network functions, of a first provider of network functions, on a cloud infrastructure of a different service provider.

Allocating the network slice using network devices of multiple service providers is a complex and time consuming task. For example, coordinating an allocation of resources between the multiple service providers may be complex and time consuming. Additionally, allocating the network slice in this manner is subject to lack of trust among the multiple service providers. For example, the service provider may be unable to ascertain capabilities of network devices of the additional service providers.

Furthermore, allocating the network slice in this manner is subject to lack of security with respect to some of the multiple service providers. For example, network security policies implemented by the service provider may be different than network security policies implemented by another service provider. Moreover, managing the service-level agreement (for the particular application) established between multiple service providers is a complex task.

In some instances, the particular application may be an application that is to be executed using a multi edge computing (MEC) platform. For example, the particular application may be an application that is to be executed using multiple MEC devices. Based on computing and graphics processing requirements of the particular application, the service provider may determine that the particular application is to be executed using MEC devices of additional service providers (e.g., cloud services providers, providers of computing services, and/or providers of graphical processing services). The MEC devices of the additional service providers may be used in addition to MEC devices of the service provider.

Currently, identifying different service providers for applications to be executed using a MEC platform is a difficult task because information regarding such service providers is not readily available. For example, information regarding locations, capacities, performance, and availabilities of MEC devices of such service providers is not readily available. Additionally, executing the particular application using MEC devices of multiple service providers is subject to lack of trust and lack of security, as explained above. Furthermore, managing a service-level agreement (for the particular application) established between multiple service providers is a complex task.

Implementations described herein are directed to managing a service-level agreement between multiple service providers for allocation of a hybrid network slice. Implementations described herein are also directed to identifying multiple service providers of a hybrid MEC platform and managing a service-level agreement between the multiple service providers of the hybrid MEC platform. As used herein, a "hybrid network slice" may refer to a network slice that involves network devices of multiple service providers (e.g., different cloud services providers and/or different network function services providers). As used herein, a "hybrid MEC platform" may refer to network devices of multiple MEC providers (e.g., different cloud services providers, different compute services providers, and/or different graphic services providers).

Implementations described herein are directed to establishing a blockchain to manage the service-level agreements mentioned above. A "blockchain," as the term is used herein, may correspond to a distributed ledger of data blocks linked using cryptographic hashes. Thus, in some embodiments, a data block may be linked to the previous data block using a hash of the contents of the previous block. Since changing the data in a previous data block would change the hash, the data stored in a blockchain cannot be changed without having to change the hashes of all subsequent data blocks, making, in this type of embodiment, the blockchain very resistant to data changes.

The blockchain may be a permissioned blockchain that is managed by a management system of a service provider. For example, the management system may grant permissions to read and/or write data to the blockchain and may revoke permissions to read and/or write data to the blockchain.

An operator device of the service provider and network devices, of third-party service providers, may be nodes of the blockchain. The third-party service providers may include cloud services providers, providers of network function services (hereinafter referred to as "network functions vendors"), providers of compute services (hereinafter referred to as "compute providers"), and/or providers of graphics processing services (hereinafter referred to as "graphics providers"). Each third-party service provider may provide service information regarding the third-party service provider. The service information may be included in the blockchain. In some situations, the service information may be provided to the operator device.

In some examples, the service information of a third-party service provider may include information regarding a cloud infrastructure deployment (for a cloud services provider), information regarding locations of one or more network devices of the third-party service provider, and/or capabilities of the one or more network devices. The capabilities may include storage capabilities, compute capabilities, and/or performance capabilities (e.g., information regarding latency, jitter, packet drop, random access memory utilization, among other examples).

In some instances, the service provider may receive (e.g., via the operator device) a request to access an application. The request may be received from a user equipment. The service provider (e.g., via the operator device) may access the service information, included in the blockchain, to identify one or more third-party service providers for a hybrid network slice and/or for a hybrid MEC platform that would comply with requirements of the application.

For example, the service provider may identify a combination of one or more cloud services providers and one or more network functions vendors for the hybrid network slice. Additionally, or alternatively, the service provider may identify a combination of one or more cloud services providers, one or more compute providers, and one or more graphics providers for the hybrid MEC platform.

The service provider may generate a service-level agreement based on the requirements of the application and include the service-level agreement in smart contracts and deploy it in the blockchain. The management system may notify the identified one or more third-party service providers of the service-level agreement. The service provider and the identified one or more third-party service providers may provide their approvals of the service-level agreement through smart contracts. Based on the acceptance, the service provider and the identified one or more third-party service providers may coordinate to allocate the hybrid network slice and/or to cause the application to be executed using the hybrid MEC platform.

During execution of the application, the network devices (of the identified one or more third-party service providers) may include, in the blockchain, performance data regarding a performance of the network devices. Additionally, during execution of the application, the network devices (of the identified one or more third-party service providers) may include, in the blockchain, fault data regarding any fault experienced by the network devices.

The management system may obtain, via the blockchain, the performance data regarding a performance of a particular network device and the fault data regarding a fault experienced by the particular network device during execution of the application. The management system may perform one or more actions based on the service-level agreement, the performance data, and/or the fault data. For example, the management system may remove the particular network device as a node of the blockchain, modify permissions granted to the network device with respect to the blockchain, perform bill settlement with respect to services provided by the particular network device, among other examples.

Implementations described herein provide several benefits. For example, the hybrid network slice and the hybrid MEC platform provide scalability with respect to computing and graphics processing of different applications. Furthermore, the hybrid network slice may provide resources to network functions associated with applications that require low latency (e.g., at an edge of a 5G/NR network). Similarly, the hybrid MEC platform may enable reduced latency and increased throughout for applications requiring a significant amount of resources for execution.

Including the service information in the blockchain may facilitate the service provider identifying appropriate network devices of third-party service providers for a hybrid network slice and/or for a hybrid MEC platform. Additionally, including the service information in the blockchain smart contracts may enable the service provider to ascertain capabilities of the network devices of the third-party service providers (e.g., because the service information in smart contracts cannot be modified by a third-party service provider). Therefore, including the service information in the smart contracts of blockchain may enable transparency to necessary participants and increase a measure of security and trust of the capabilities of network devices.

Additionally, including the service information in the blockchain may enable the service provider to ascertain network security policies implemented by the third-party service providers. Furthermore, including the service-level agreement in the blockchain along with the performance data and the fault data may facilitate the management system determining whether the network devices complied with the service-level agreement. In this regard, the management system may perform an action with respect to the network devices of the third-party devices.

FIGS. 1A-1G are diagrams of an example 100 associated with using blockchain to manage service-level agreements between multiple service providers. As shown in FIGS. 1A-1G, example 100 includes a management system 105, an operator device 125, a user equipment 130, and network devices 135 (collectively "network devices 135" and individually "network device 135"). Management system 105, operator device 125, and network devices 135 are described in more detail below in connection with FIG. 2.

Management system 105 may include one or more devices, of a service provider, configured to manage access to a blockchain. In this regard, management system 105 may operate as a managing node of the blockchain. For example, the blockchain may be a permissioned blockchain (e.g., a permission-based blockchain). In this regard, management system 105 may be configured to grant or revoke permissions to access the blockchain, as explained herein. Additionally, or alternatively, management system 105 may perform actions based on service-level agreements encoded in smart contracts between multiple service providers, as explained herein.

As shown in FIG. 1A, management system 105 may include a service registration component 110, a performance evaluation component 115, and a settlement component 120. Service registration component 110 may be configured to receive service information of third-party service providers. In some implementations, service registration component 110 may be configured to provide the service information to operator device 125 to enable operator device 125 to generate service-level agreements.

Performance evaluation component 115 may be configured to obtain performance data of network devices 135 regarding performances of network devices 135 and fault data regarding faults experienced by network devices 135, as explained herein. Settlement component 120 may be configured to evaluate the performances of and/or the faults experienced by network devices 135 and perform actions based on evaluating the performances and the faults, as explained herein.

Operator device 125 may include one or more devices, of the service provider, configured to cause one or more services to be provided to user device 130. For example, user device 130 may provide a request to access an application. Based on the request, operator device 125 may determine a hybrid network slice that may support proper execution of the application, as explained herein. Additionally, or alternatively, operator device 125 may determine a hybrid MEC platform that may support computing needs and/or processing needs of the application, as explained herein.

Network devices 135 may include devices, of third-party service providers, that are configured to provide different types of network services. For example, network devices 135 may include devices configured to provide cloud services. Additionally, or alternatively, network devices 135 may include devices configured to provide network functions.

In some examples, the network functions, provided by network devices 135, may include a network slice selection function (NSSF), a network exposure function (NEF), an authentication server function (AUSF), a unified data management (UDM) component, a policy control function (PCF), an application function (AF), an access and mobility management function (AMF), a session management function (SMF), and/or a user plane function (UPF).

Additionally, or alternatively, network devices 135 may include devices configured to provide computing services (e.g., associated with MEC services). For example, network devices 135 may include central processing units. Additionally, or alternatively, network devices 135 may include devices configured to provide graphics processing services (e.g., associated with MEC services). For example, network devices 135 may include graphics processing units.

As shown in FIG. 1A, operator device 125 and network devices 135 may provide requests to become nodes of the blockchain. For example, the service provider and the third-party service providers may determine to participate allocations of hybrid network slices and/or determine to be include in hybrid MEC platforms. In this regard, management system 105 may receive the request from operator device 125 and from network devices 135.

As shown in FIG. 1A, and by reference number 140, management system 105 may determine whether to accept or deny the requests. Management system 105 may determine to accept the request from operator device 125 based on the operator device 125 and management system 105 being devices of the service provider. In this regard, management system 105 provide a blockchain application to operator device 125 and grant operator device 125 access to the blockchain (e.g., permission to read and/or write to the blockchain). The blockchain application may enable operator device 125 to access information included in the blockchain.

In some situations, management system 105 may determine whether to accept or deny the requests from network devices 135 based on various factors. The factors may include a location of a network device, capabilities of the network device, types of services provided by the network device, and/or a quantity of nodes to be included in the blockchain. In some situations, the factors may be determined by the service provider.

The requests from network devices 135 may include information identifying location of a network device, capabilities of the network device, types of services provided by the network device, a quantity of nodes to be included in the blockchain. In this regard, management system 105 may determine whether to accept or deny the requests based on the factors and the information included in the requests. For example, management system 105 may accept the request from a particular network device 135 if the information (included in the request) satisfies the factors. Alternatively, management system 105 may deny the request from the particular network device 135. If management system 105 accepts the request, management system 105 provide the blockchain application to the particular network device 135 and grant the particular network device 135 access to the blockchain (e.g., permission to read and/or write to the blockchain).

As shown in FIG. 1A, and by reference number 145, management system 105 may receive service information from network devices 135. For example, after granting access to the blockchain, management system 105 may receive the service information (of the third-party service providers) from network devices 135. In some implementations, network devices 135 may include the service information in the blockchain. For example, network devices 135 may write the service information to the blockchain using the blockchain application and management system 105 (e.g., service registration component 110) may receive the service information via the blockchain.

In some examples, the service information of a third-party service provider may include information regarding a cloud infrastructure deployment (if the third-party service provider is a cloud services provider), information regarding locations of network devices 135 of the third-party service provider, information regarding availability of network devices 135 (e.g., particular periods in the mornings, evenings, weekends, among other examples), information indicating whether technical support is provided for network devices 135, and/or information regarding capabilities of network devices 135. The capabilities may include storage capabilities, compute capabilities, and/or performance capabilities (e.g., information regarding latency associated with network devices 135, jitter associated with network devices 135, packet drop associated with network devices 135, random access memory utilizations of network devices 135, among other examples).

Figure 1C:
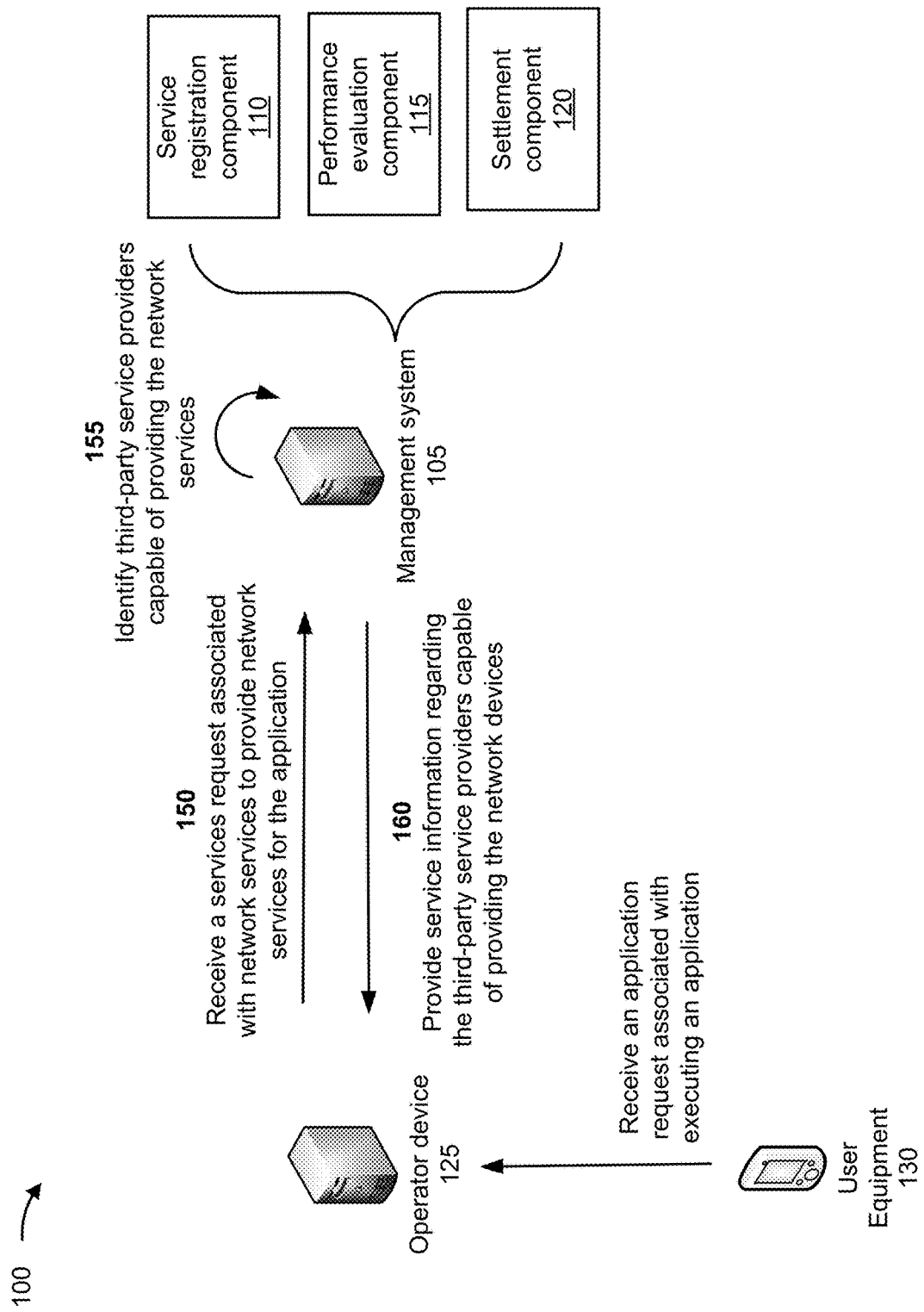

As shown in FIG. 1C, operator device 125 may receive an application request associated with executing an application. The application request may be received from user device 130 as a result of user device 130 attempting to access the application. In some examples, the application may include an augmented reality/virtual reality application, an application used to interact with an autonomous vehicle, an application used to perform robotics operations, an application used to control an unmanned aerial vehicle that provides live streaming of a video captured by the unmanned aerial vehicle.

As shown in FIG. 1C, and by reference number 150, management system 105 may receive a services request associated with network devices to provide network services for the application. For example, based on receiving the application request from user device 130, operator device 125 may provide the services request to identify network devices 135 that are capable of providing network services for the application. The services request may include requirements associated with executing the application. In some situations, the services request may include information indicating whether a hybrid network slice is to be allocated for the application and/or whether the application is to be executed using a hybrid MEC platform.

The requirements may include information identifying a latency requirement, a compute requirement, a storage requirement, a throughput requirement, and/or a graphics processing requirement, among other examples. Alternatively to providing the services request, operator device 125 may access the service information, included in the blockchain, to identify network devices 135 that are capable of providing network services that satisfy the requirements associated with executing the application.

As shown in FIG. 1C, and by reference number 155, management system 105 may identify service providers capable of providing the network services. For example, management system 105 (e.g., using service registration component 110) may analyze the service information to identify third-party providers with network devices 135 that are capable of complying with the requirements associated with executing the application. In some situations, management system 105 may identify one or more cloud services providers and one or more network functions vendors that may allocate the hybrid network slice. Additionally, or alternatively, management system 105 may identify one or more cloud services providers, one or more compute service providers, and/or one or more graphics service providers.

As shown in FIG. 1C, and by reference number 160, management system 105 may provide service information regarding the third-party service providers capable of providing the network services. For example, based on the services request, management system 105 (e.g., using service registration component 110) may provide the service information of the third-party service providers identified by management system 105. Alternatively, operator device 125 may be pre-configured with the service information.

Based on the service information of the third-party service providers and based on the requirements of the application, operator device 125 may generate a service-level agreement associated with the service providers to be provided by network devices 135. The service-level agreement may identify the requirements of the application, identify the third-party service providers, identify network devices 135 of the third-party service providers, identify network services that are to be provided by the third-party service providers, among other examples.

Figure 1D:
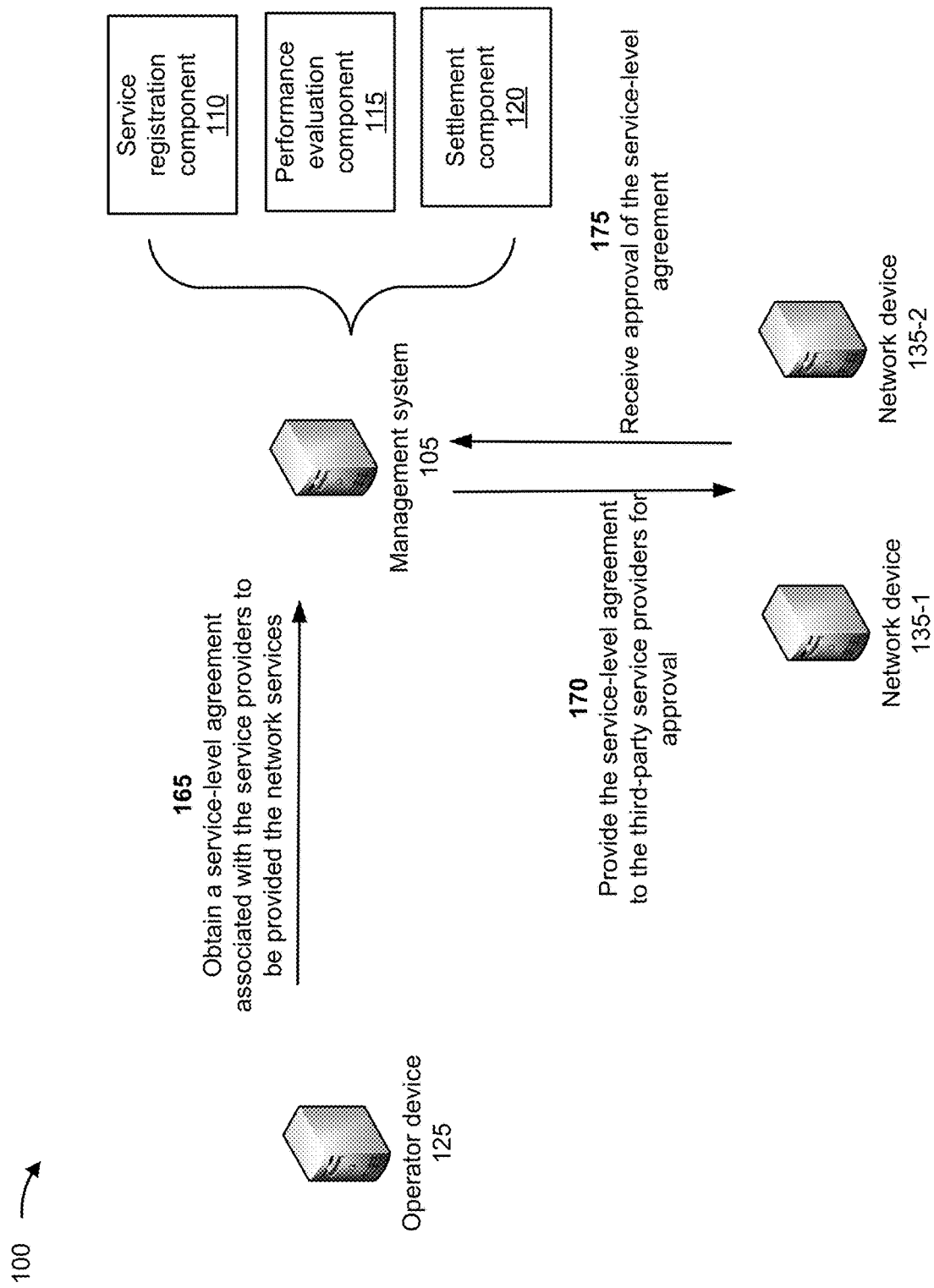

As shown in FIG. 1D, and by reference number 165, management system 105 may obtain the service-level agreement associated with the service providers to be provided by network devices 135. For example, operator device 125 may include the service-level agreement in the blockchain and management system 105 may obtain the service-level agreement via the blockchain. As explained herein, management system 105 may be a decentralized application that is built using smart contracts and deployed in permissioned blockchain network. Operator device 125 may play an administrative role and other software or cloud suppliers may play a non administrative role.

As shown in FIG. 1D, and by reference number 170, management system 105 may provide the service-level agreement to the third-party service providers for approval. For example, management system 105 may provide the service-level agreement to network devices 135 of the third-party service providers for approval of terms and conditions of the service-level agreement.

As shown in FIG. 1D, and by reference number 175, management system 105 may receive approval of the service-level agreement. For example, network devices 135 may receive an approval from each network devices 135 of each third-party service provider identified by management system 105. In some implementations, operator device 125 may determine that the approval from each network devices 135 of each third-party service provider identified by management system 105. Based on determining that the approval has been received, the service provider may coordinate with the third-party service providers to cause the hybrid network slice to be allocated for execution of the application and/or to cause the application to be executed via the hybrid MEC platform.

During execution of the application, network devices 135 may include, in the blockchain, the performance data regarding performances network devices 135. Additionally, during execution of the application, network devices 135 may include (in the blockchain) fault data regarding any fault experienced by network devices 135. The performance data may include cloud infrastructure, cloud service, network function, and end-to-end application performance metrics.

Figure 1E:
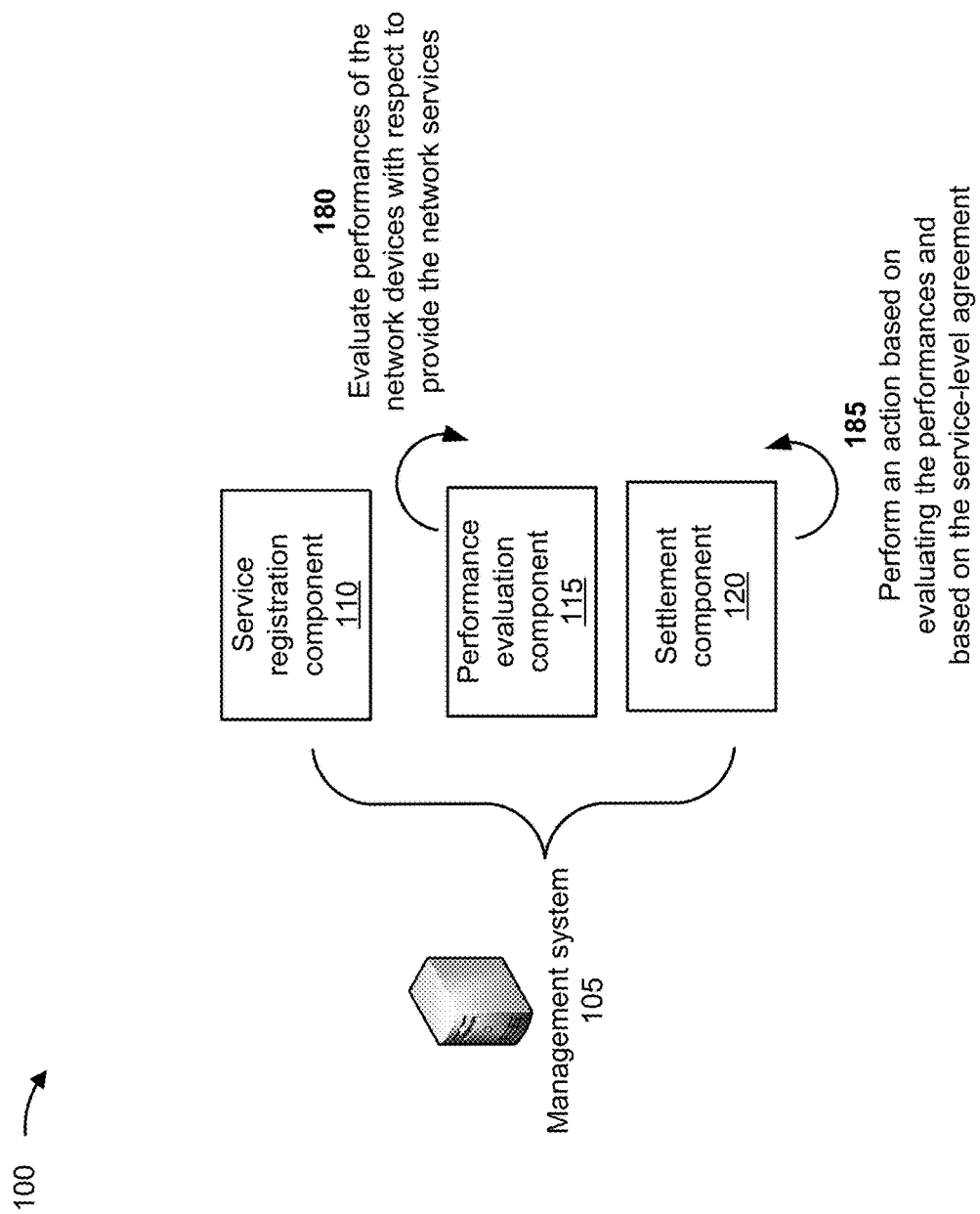

As shown in FIG. 1E, and by reference number 180, management system 105 may evaluate performances of the network devices with respect to providing the network services. For example, management system 105 (e.g., using performance evaluation component 115) may obtain the performance data and the fault data via the blockchain. As the service-level agreement is encoded in smart contracts, smart contracts evaluate a service-level agreement logic either automatically based on certain conditions/time period for provisioned hybrid slice or manually based on an operator trigger.

For instance, management system 105 may obtain, via the blockchain, the performance data regarding a performance of a particular network device 135 during a period of time associated with execution of the application. Management system 105 may determine whether the performance satisfies a performance threshold identified by the service-level agreement. For example, management system 105 may determine whether a latency associated with the particular network device 135 satisfies a latency threshold, whether jitter associated with the particular network device 135 satisfies a jitter threshold, whether a packet drop associated with the particular network device 135 satisfies a packet drop threshold, whether random access memory utilizations of the particular network device 135 satisfy a random access memory utilization threshold, among other examples Additionally, or alternatively determining whether the performance satisfies the performance threshold, management system 105 may obtain, via the blockchain, the fault data regarding any fault experienced by the particular network device 135 during the period of time associated with execution of the application. Network devices 135 may determine whether the fault satisfies a fault threshold identified by the service-level agreement.

As shown in FIG. 1E, and by reference number 185, management system 105 may perform an action based on evaluating the performances and based on the service-level agreement. For example, based on determining that the performance does not satisfy the performance threshold and/or determining that the fault satisfies the fault threshold, management system 105 may remove the particular network device 135 as a node of the blockchain.

Additionally, or alternatively, management system 105 may revoke permission of the particular network device 135 to read and write data to the blockchain. Additionally, or alternatively, management system 105 may adjust a classification of a third-party service provider associated the particular network device 135 (e.g., by downgrading a rating or the classification of the third-party service provider). By downgrading the rating or the classification, the third party service provider (e.g., software/platform provider) will not be preferred during a subsequent iteration as a part of a hybrid slice formation or a hybrid MEC platform formation. Additionally, or alternatively, management system 105 may perform a billing settlement for the third-party service provider by compensating the third-party service provider in accordance with the performance and/or the fault of the particular network device 135.

Implementations described herein provide several benefits. For example, the hybrid network slice and the hybrid MEC platform provide scalability with respect to computing and graphics processing of different applications. Furthermore, the hybrid network slice may provide resources to network functions associated with applications that require low latency (e.g., at an edge of a network or, in other words, close to an end user). Similarly, the hybrid MEC platform may enable reduced latency and increased throughout for applications requiring a significant of resources for execution.

Including the service information in the blockchain may facilitate the service provider identifying appropriate network devices of third-party service providers for a hybrid network slice and/or for a hybrid MEC platform. Additionally, including the service information in the blockchain may enable the service provider to ascertain capabilities of the network devices of the third-party service providers (e.g., because the service information cannot be modified by a third-party service provider). Therefore, including the service information in the blockchain may increase a measure of trust of the capabilities of network devices. The measure of trust may be increased because the service information is cryptographically secured.

Additionally, including the service information in the blockchain may enable the service provider to ascertain network security policies implemented by the third-party service providers. Furthermore, including the service-level agreement in the blockchain along with the performance data and the fault data may facilitate the management system determining whether the network devices complied with the service-level agreement. In this regard, the management system may perform an action with respect to the network devices of the third-party devices.

Implementations described herein also provide additional trust, network, user data security, tamper proof, and simplified service-level agreement management process, thereby ensuring an optimal customer experience with as minimum deployment. Furthermore, implementations described herein provide an architecture that reduces roaming. Additionally, by using infrastructure and network devices of third-party service providers, implementations herein preserve the need for deploying additional infrastructure and additional network devices. Furthermore, implementations described herein to increase a density of compute or graphic processing intensive service deployment to serve as many customers as possible at different locations.

Figure 1F:
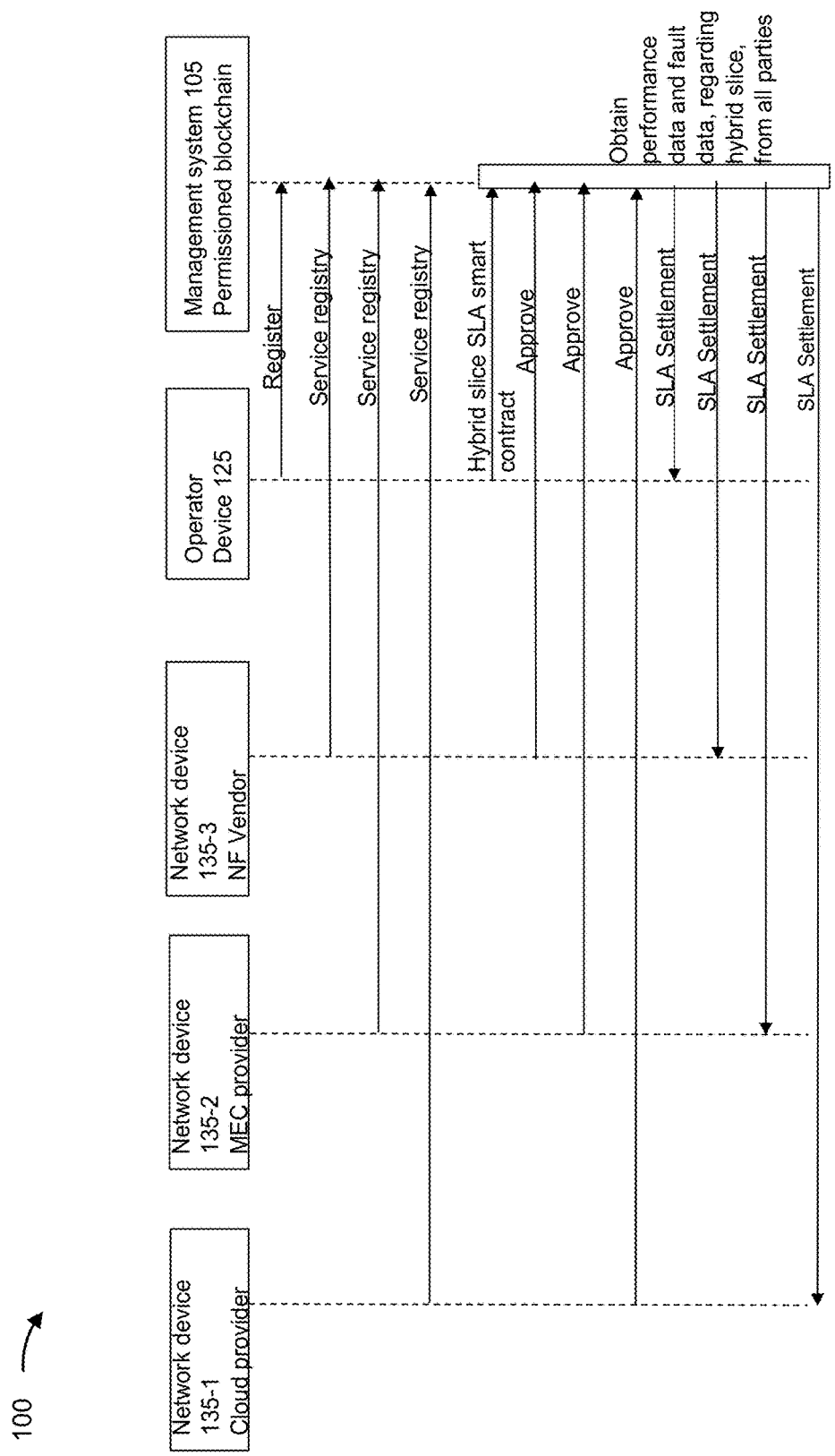

FIG. 1F illustrates a flow associated with allocating a hybrid network slice. As shown in FIG. 1F, operator device 125 and network devices 135-1 to 135-3 may register to become nodes of the blockchain. Management system 105 may identify network devices 135-1 to 135-3 as network devices capable of allocating the hybrid network slice. Operator device 125 may generate a service-level agreement for the hybrid network service which may be approved by network devices 135-1 to 135-3. Management system 105 may obtain performance data and fault data regarding network devices 135-1 to 135-3 and perform one or more actions based on performance data and fault data, as explained herein.

Figure 1G:
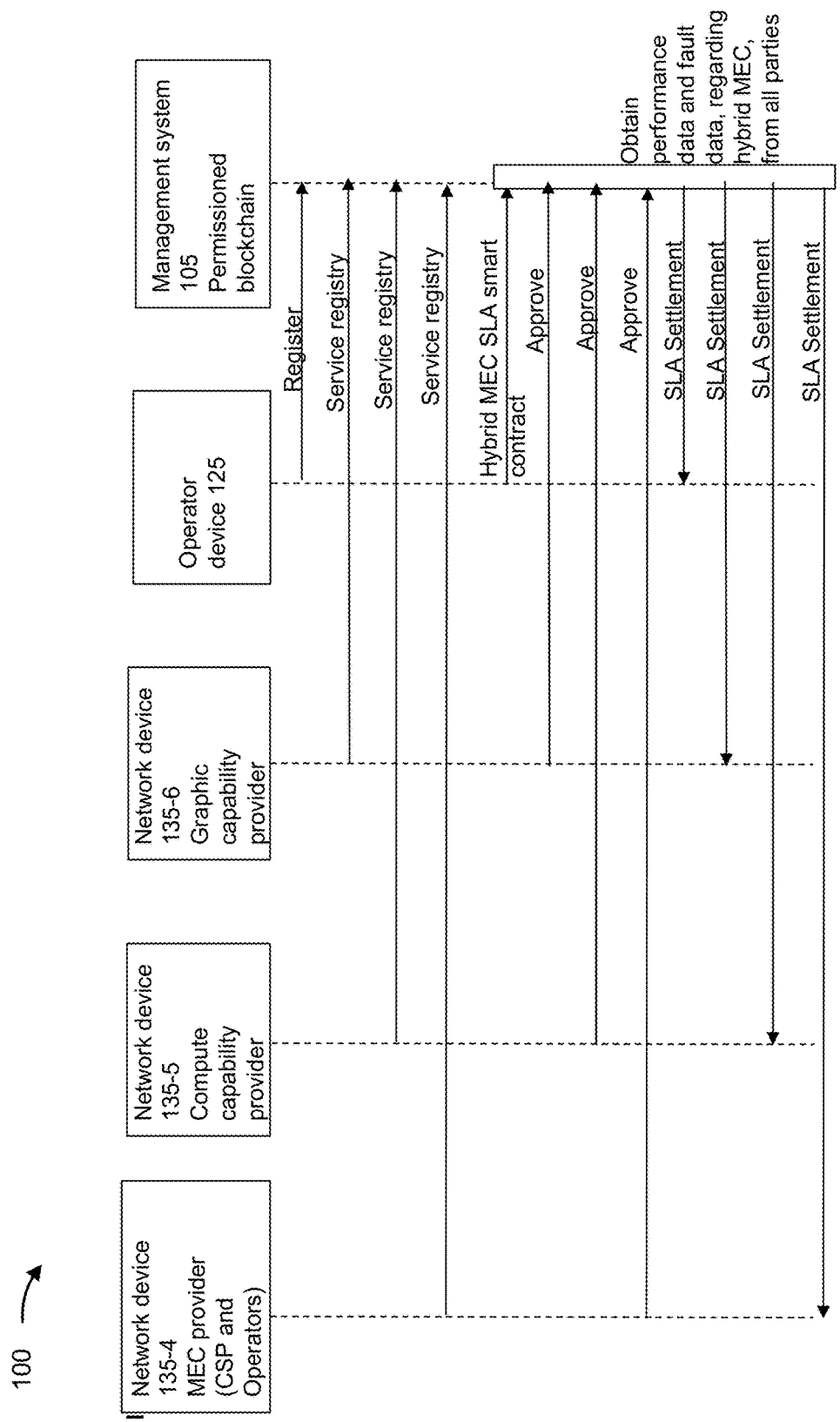

FIG. 1G illustrates a flow associated with establish a hybrid MEC platform. As shown in FIG. 1G, operator device 125 and network devices 135-4 to 135-6 may register to become nodes of the blockchain. Management system 105 may identify network devices 135-4 to 135-6 as network devices to become part of the hybrid MEC platform. Operator device 125 may generate a service-level agreement for the hybrid MEC platform. The service-level agreement may be approved by network devices 135-4 to 135-6. Management system 105 may obtain performance data and fault data regarding network devices 135-3 to 135-6 and perform one or more actions based on performance data and fault data, as explained herein.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
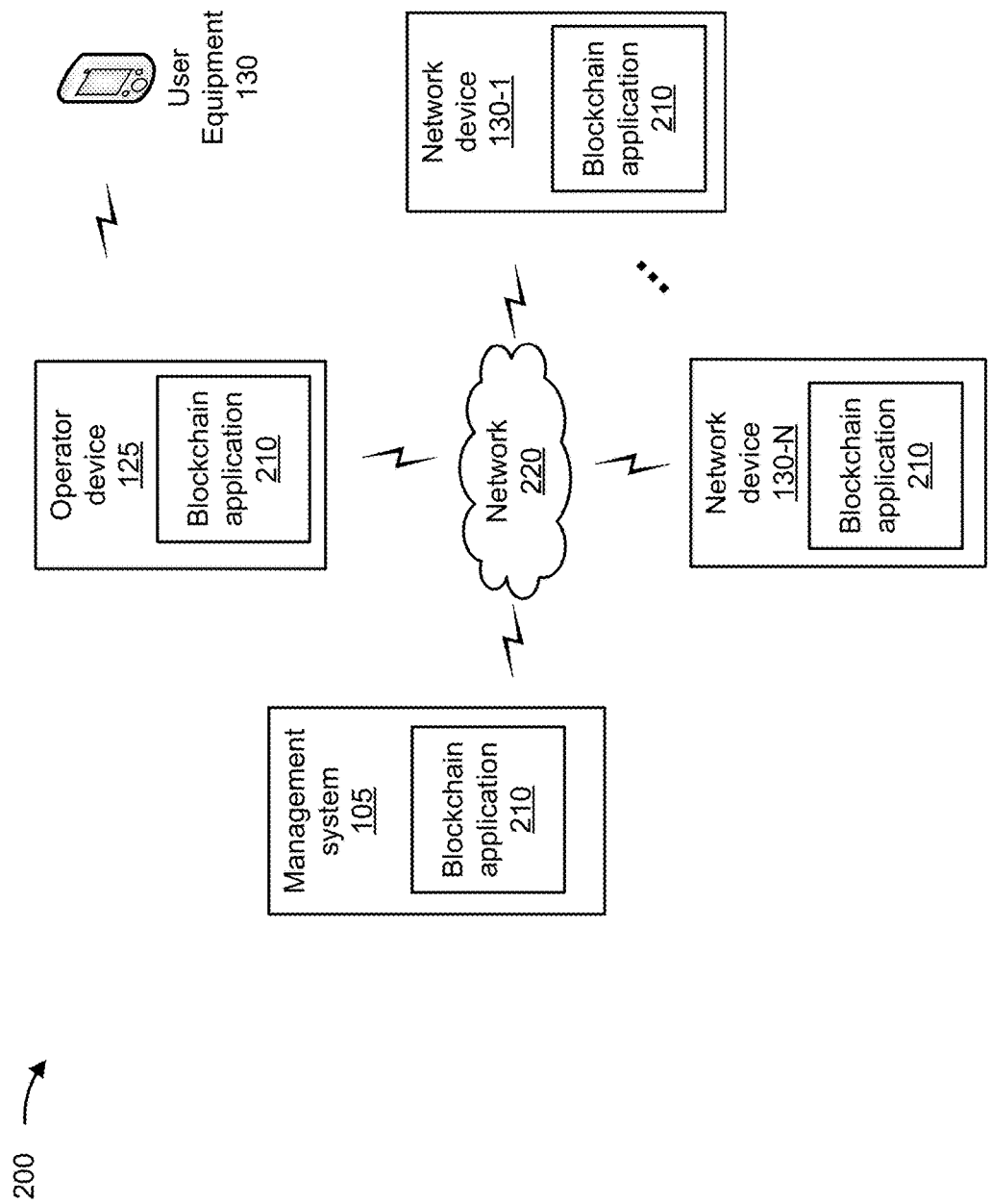
FIG. 2 is a diagram of an example environment in which systems and/or methods described herein may be implemented.

FIG. 2 is a diagram of an example environment 200 in which systems and/or methods described herein may be implemented. Some elements of environment 200 have been described above in connection with FIG. 1. In some implementations, management system 105 may include one or more elements of and/or may execute within a cloud computing system. As further shown in FIG. 2, environment 200 may include operator device 125, user device 130, network devices 135, and/or a network 220. Devices and/or elements of environment 200 may interconnect via wired connections and/or wireless connections.

In some situations, management system 105 may include a server, such as an application server, a client server, a web server, a database server, a host server, a proxy server, a virtual server (e.g., executing on computing hardware), or a server in a cloud computing system. In some implementations, management system 105 includes computing hardware used in a cloud computing environment.

User device 130 includes one or more devices capable of receiving, generating, storing, processing, and/or providing information associated with managing service-level agreements using a block, as described elsewhere herein. User device 130 may include a communication device and a computing device. For example, user device 130 may include a wireless communication device, a mobile phone, a user equipment, a laptop computer, a tablet computer, a desktop computer, or a similar type of device.

In some situations, a network device 135 may include a server, such as an application server, a client server, a web server, a database server, a host server, a proxy server, a virtual server (e.g., executing on computing hardware), or a server in a cloud computing system. In some implementations, the management system 105 includes computing hardware used in a cloud computing environment.

As shown in FIG. 2, management system 105, operator device 125, and network devices 135 may include blockchain application 210. Blockchain application 210 may be executed to instantiate an instance of the blockchain. Data may be written to and read from the blockchain using blockchain application 210.

Network 220 includes one or more wired and/or wireless networks. For example, network 220 may include a cellular network, a public land mobile network (PLMN), a local area network (LAN), a wide area network (WAN), a private network, the Internet, and/or a combination of these or other types of networks. The network 220 enables communication among the devices of environment 200.

In some examples, network 220 may include a core network that includes various types of core network architectures, such as a 5G Next Generation (NG) Core, an LTE Evolved Packet Core (EPC), among other examples. In some implementations, the core network can be implemented on physical devices, such as a gateway, a mobility management entity, among other examples. In some implementations, the hardware and/or software implementing the core network can be virtualized (e.g., through the use of network function virtualization and/or software-defined networking), thereby allowing for the use of composable infrastructure when implementing the core network. In this way, networking, storage, and compute resources can be allocated to implement the functions of the core network in a flexible manner as opposed to relying on dedicated hardware and software to implement these functions.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
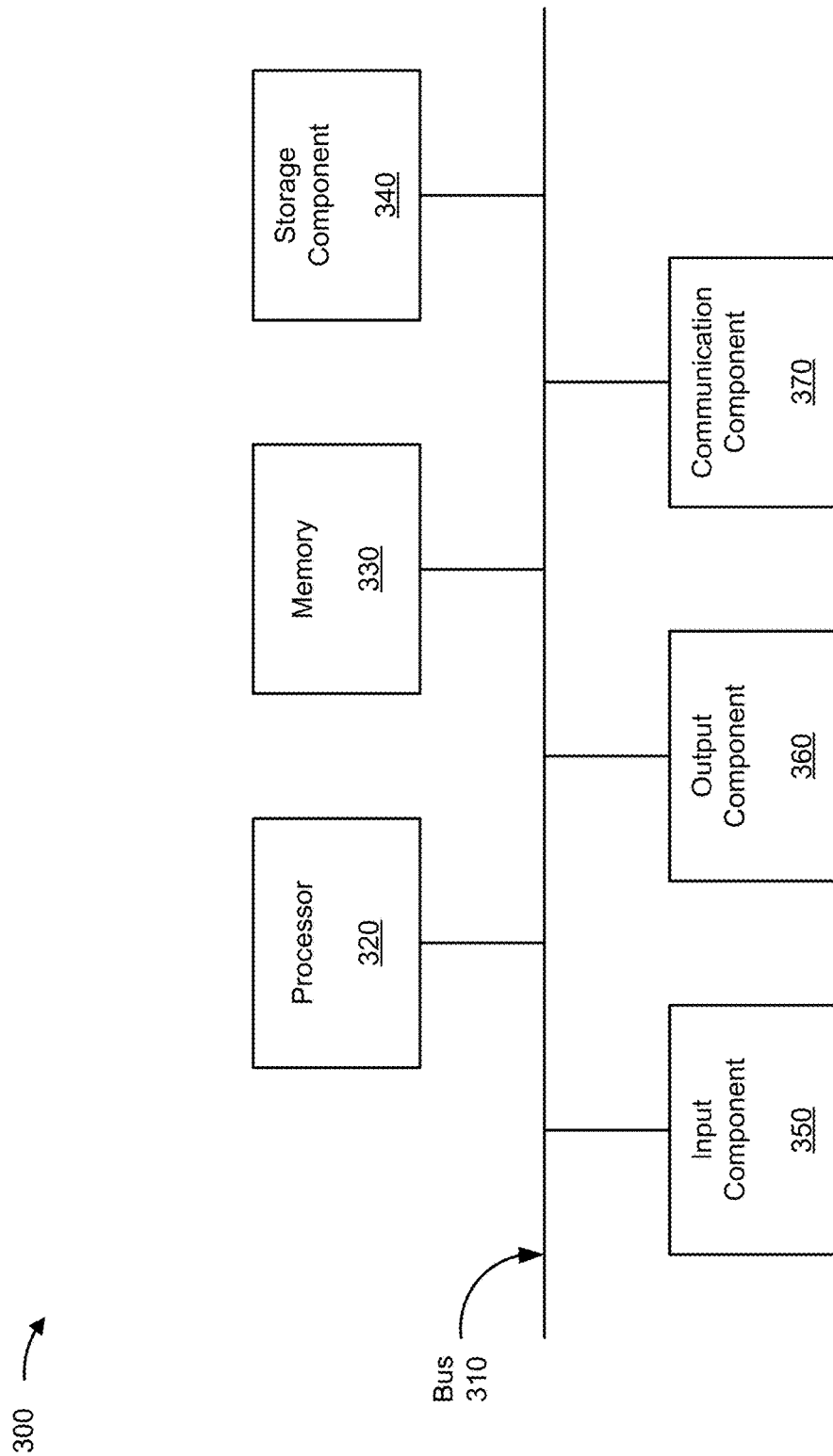
FIG. 3 is a diagram of example components of one or more devices of FIG. 2.

FIG. 3 is a diagram of example components of a device 300, which may correspond to management system 105, operator device 125, user device 130, and/or network devices 135. In some implementations, management system 105, operator device 125, user device 130, and/or network devices 135 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
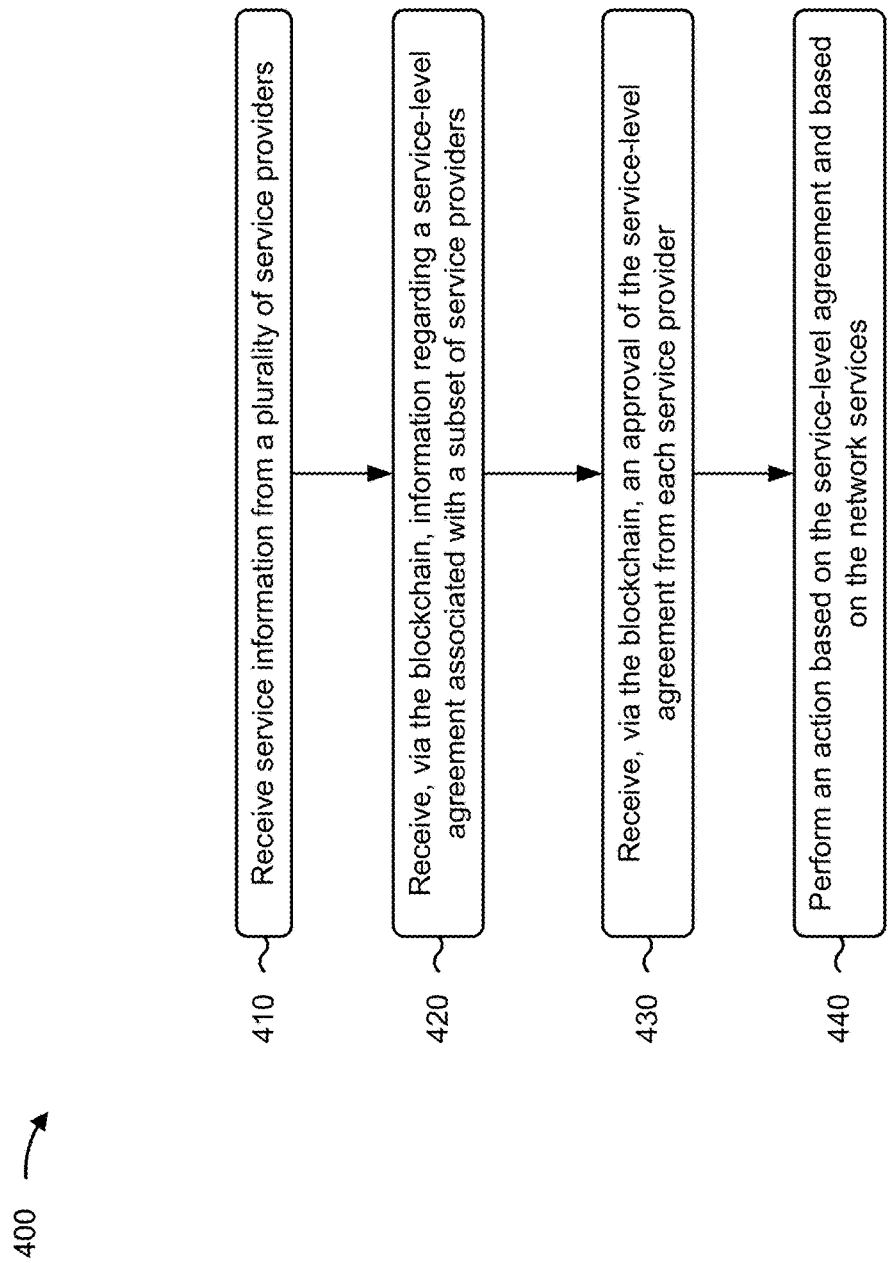
FIG. 4 is a flowchart of an example process relating to using blockchain to manage service-level agreements between multiple service providers.

FIG. 4 is a flowchart of an example process 400 process relating to using blockchain to manage service-level agreements between multiple service providers. In some implementations, one or more process blocks of FIG. 4 may be performed by a management system (e.g., management system 105). In some implementations, one or more process blocks of FIG. 4 may be performed by another device or a group of devices separate from or including the management system, such as an operator device (e.g., operator device 125) and/or network devices (e.g., network devices 135). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving service information from a plurality of service providers (block 410). For example, the management system may receive service information from a plurality of service providers, wherein a plurality of network devices, of the plurality of service providers, are blockchain nodes of the blockchain, and wherein the service information, of a service provider, identifies network services provided by a network device of the service provider and identifies a location of the network device, as described above. In some implementations, a plurality of network devices, of the plurality of service providers, are blockchain nodes of the blockchain. In some implementations, the service information, of a service provider, identifies network services provided by a network device of the service provider and identifies a location of the network device.

As further shown in FIG. 4, process 400 may include receiving, via the blockchain, information regarding a service-level agreement associated with a subset of service providers, of the plurality of service providers, providing network services for an application (block 420). For example, the management system may receive, via the blockchain, information regarding a service-level agreement associated with a subset of service providers, of the plurality of service providers, providing network services for an application, as described above.

As further shown in FIG. 4, process 400 may include receiving, via the blockchain, an approval of the service-level agreement from each service provider of the subset of service providers (block 430). For example, the management system may receive, via the blockchain, an approval of the service-level agreement from each service provider of the subset of service providers, as described above.

As further shown in FIG. 4, process 400 may include performing an action based on the service-level agreement and based on the network services provided by the subset of service providers for the application (block 440). For example, the management system may perform an action based on the service-level agreement and based on the network services provided by the subset of service providers for the application, as described above.

In some implementations, the subset of service providers includes a cloud services provider and a network function service provider, wherein the network services include a cloud service and a network function, wherein the service-level agreement relates to a network slice associated with the application, and wherein the network services are associated with allocating the network slice for the application.

In some implementations, the blockchain is a permission-based blockchain.

In some implementations, the subset of service providers includes multi-access edge computing (MEC) providers, and wherein the network devices include MEC devices.

In some implementations, performing the action comprises obtaining, via the blockchain, performance data regarding a performance of a particular network device, of a subset of network devices of the plurality of network devices, during a period of time when the subset of network devices is providing the network services, and determining whether the performance satisfies a performance threshold, wherein the action is based on whether the performance satisfies the performance threshold.

In some implementations, performing the action comprises determining that the performance does not satisfy the performance threshold, and one or more of removing the particular network device as a node of the blockchain, or adjusting a classification of a service provider associated the particular network device.

In some implementations, performing the action comprises obtaining, via the blockchain, fault data regarding a fault experienced by a particular network device, of a subset of network devices of the plurality of network devices, during a period of time when the subset of network devices are providing the network services, and determining whether the fault satisfies a fault threshold, wherein the action is based on whether the fault satisfies the fault threshold.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like. In some examples, the threshold may be based on values (performance and fault metric) and/or based on time (for a particular duration). The threshold is agreed in the service-level agreement and encoded in smart contracts. This smart contract will either self-execute based on the threshold or a manual trigger.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method performed by a management system, the method comprising:
   receiving service information from a plurality of service providers,
      wherein a plurality of network devices, of the plurality of service providers, are blockchain nodes of a blockchain, and wherein the service information, of a service provider, identifies network services provided by a network device of the service provider and identifies a location of the network device;
   receiving, via the blockchain, information regarding a service-level agreement associated with a subset of service providers, of the plurality of service providers, providing network services for an application;
   receiving, via the blockchain, an approval of the service-level agreement from each service provider of the subset of service providers;
   obtaining, via the blockchain, performance data regarding a performance of a first network device of a subset of network devices of the plurality of network devices and fault data regarding a fault experienced by a second network device of the subset of network device;
   removing the first network device as a node of the blockchain based on the performance of the first network device; and
   downgrading a classification of a service provider associated with the second network device based on the fault experienced by the second network device.

2. The method of claim 1, wherein the subset of service providers includes a cloud service provider and a network function service provider,
   wherein the network services include a cloud service and a network function,
   wherein the service-level agreement relates to a network slice associated with the application, and
   wherein the network services are associated with allocating the network slice for the application.

3. The method of claim 1, wherein the blockchain is a permission-based blockchain.

4. The method of claim 1, wherein the subset of service providers includes different services providers that include two or more of a cloud services provider, a provider of network function services, a provider of compute services, or a provider of graphics processing services,
   wherein the subset of service providers includes multi-access edge computing (MEC) providers,
   wherein network devices, of the subset of service providers, include MEC devices,
   wherein the network services are associated with allocating a network slice for the application, and
   wherein the network slice involves the network devices of the subset of service providers including the two or more of the cloud services provider, the provider of network function services, the provider of computer services, or the provider of graphics processing services.

5. The method of claim 1, wherein obtaining the performance data and the fault data comprises:
   obtaining, via the blockchain, the performance data during a period of time when the subset of network devices is providing the network services; and
   determining whether the performance satisfies a performance threshold.

6. The method of claim 5, further comprising:
   determining that the performance does not satisfy the performance threshold; and
   removing the first network device as a node of the blockchain based on determining that the performance does not satisfy the performance threshold.

7. The method of claim 1, wherein obtaining the performance data and the fault data comprises:
   obtaining, via the blockchain, the fault data during a period of time when the subset of network devices are providing the network services; and
   wherein the method further comprises:
      determining whether the fault satisfies a fault threshold; and
      downgrading the classification of the service provider associated with the second network device based on whether the fault satisfies the fault threshold.

8. A management system, comprising:
   one or more processors configured to:
      receive service information from a plurality of service providers,
         wherein a plurality of network devices, of the plurality of service providers, are blockchain nodes of a blockchain, and
         wherein the service information, of a service provider, identifies network services provided by a network device of the service provider and identifies a location of the network device;
      identify a subset of service providers, of the plurality of service providers, configured to provide network services for an application,
         wherein the subset of service providers includes different services providers, and wherein the different services providers include two or more of a cloud services provider, a provider of network function services, a provider of compute services, or a provider of graphics processing services;
      receive, via the blockchain, information regarding a service-level agreement associated with the subset of service providers providing network services for the application,
         wherein the network services are associated with allocating a network slice for the application, and
         wherein the network slice involves network devices of the subset of service providers;

receive, via the blockchain, an approval of the service-level agreement from each service provider of the subset of service providers; and perform an action based on the service-level agreement and based on the network services provided by the subset of service providers for the application, wherein, to perform the action, the one or more processors are configured to:

remove a particular network device, of network devices of the subset of service providers, as a node of the blockchain based on a performance of the particular network device.

9. The management system of claim 8, wherein the subset of service providers includes multi-access edge computing (MEC) providers, and wherein the network devices include MEC devices.

10. The management system of claim 9, wherein the service information, for an MEC provider, further includes at least one of:

information identifying a storage capacity of a MEC device of the MEC provider, or information identifying a compute capacity of the MEC device of the MEC provider.

11. The management system of claim 8, wherein the particular network device is a first network device, and wherein the one or more processors, to perform the action, are configured to:

obtain, via the blockchain, fault data regarding a fault experienced by a second network device, of the subset of network devices of the plurality of network devices, during a period of time when the subset of network devices are providing the network services; and determine whether the fault satisfies a fault threshold, wherein the action is performed based on whether the fault satisfies the fault threshold.

12. The management system of claim 11, wherein the one or more processors, to perform the action, are configured to:

determine that the fault satisfies the fault threshold; and one or more of:

remove the second network device as a node of the blockchain, or adjust a classification of a service provider associated with the second network device.

13. The management system of claim 8, wherein the one or more processors, to perform the action, are configured to:

obtain, via the blockchain, performance data regarding the performance of the particular network device during a period of time when the network devices are providing the network services; and determine whether the performance satisfies a performance threshold, wherein the action is based on whether the performance satisfies the performance threshold.

14. The management system of claim 8, wherein the subset of service providers includes the cloud services provider and a network function service provider, wherein the network services include a cloud service and a network function, and wherein the service-level agreement relates to the network slice associated with the application.

15. A non-transitory computer-readable medium storing a set of instructions, the set of instructions comprising:

one or more instructions that, when executed by one or more processors of a device, cause the device to:

receive service information from a plurality of service providers, wherein a plurality of network devices, of the plurality of service providers, are blockchain nodes of a blockchain, and wherein the service information, of a service provider, identifies network services provided by a network device of the service provider and identifies a location of the network device;

receive, via the blockchain, information regarding a service-level agreement associated with a subset of service providers, of the plurality of service providers, configured to provide network services for an application;

receive, via the blockchain, an approval of the service-level agreement from each service provider of the subset of service providers; and perform an action based on the service-level agreement and based on the network services provided by the subset of service providers for the application, wherein the one or more instructions, that cause the device to perform the action, cause the device to:

remove a particular network device, of network devices of the subset of service providers, as a node of the blockchain based on a performance of the particular network device or a fault experienced by the particular network device.

16. The non-transitory computer-readable medium of claim 15, wherein the one or more instructions further cause the device to:

identify the subset of service providers; and provide information regarding the subset of service providers to cause the service-level agreement to be generated.

17. The non-transitory computer-readable medium of claim 15, wherein the one or more instructions, that cause the device to perform the action, cause the device to:

obtain, via the blockchain, performance data regarding the the performance of the particular network device during a period of time when the subset of network devices are providing the network services; and determine whether the performance satisfies a performance threshold, wherein the action is based on whether the performance satisfies the performance threshold.

18. The non-transitory computer-readable medium of claim 15, wherein the particular network device is a first network device, and wherein the one or more instructions, that cause the device to perform the action, cause the device to:

obtain, via the blockchain, fault data regarding a fault experienced by a second network device, of the subset of network devices during a period of time when the subset of network devices are providing the network services; and determine whether the fault satisfies a fault threshold, wherein the action is based on whether the fault satisfies the fault threshold.

19. The non-transitory computer-readable medium of claim 18, wherein the service-level agreement relates to a network slice associated with the application, and wherein the network services are associated with allocating the network slice for the application.

20. The non-transitory computer-readable medium of claim 15, wherein the subset of service providers includes multi-access edge computing (MEC) providers, wherein the network devices include MEC devices, and wherein the service information, of a MEC provider, further includes at least one of:

information identifying a storage capacity of an MEC device of the MEC provider, or
information identifying a compute capacity of the MEC device of the MEC provider.

\* \* \* \* \*